United States Patent
Allison et al.

(10) Patent No.: US 6,615,334 B2
(45) Date of Patent: Sep. 2, 2003

(54) METHOD AND APPARATUS FOR I/O DATA MANAGEMENT WITH AN I/O BUFFER IN COMPRESSED MEMORY SUBSYSTEM

(75) Inventors: Brian David Allison, Rochester, MN (US); Scott D. Clark, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 408 days.

(21) Appl. No.: 09/748,982

(22) Filed: Dec. 27, 2000

(65) Prior Publication Data

US 2002/0083294 A1 Jun. 27, 2002

(51) Int. Cl.[7] .............................................. G06F 13/14
(52) U.S. Cl. ...................................... 711/170; 711/135
(58) Field of Search .................................. 711/118, 113, 711/135, 170, 173; 710/68

(56) References Cited

U.S. PATENT DOCUMENTS

| | | | | |
|---|---|---|---|---|
| 5,237,460 A | * | 8/1993 | Miller et al. ..................... | 360/8 |
| 5,490,260 A | * | 2/1996 | Miller et al. ................. | 395/427 |
| 5,559,978 A | * | 9/1996 | Spilo ........................... | 395/413 |
| 5,696,926 A | * | 12/1997 | Culbert et al. .............. | 395/413 |
| 5,696,927 A | * | 12/1997 | MacDonald et al. ........ | 395/417 |
| 5,812,817 A | * | 9/1998 | Hovis et al. ........... | 395/497.04 |
| 6,370,631 B1 | * | 4/2002 | Dye ........................... | 711/170 |

* cited by examiner

Primary Examiner—Kevin L. Ellis
(74) Attorney, Agent, or Firm—Joan Pennington

(57) ABSTRACT

A method and apparatus are provided for implementing input/output IO data management with an I/O buffer (IOB) directory in a compressed memory subsystem. Processor and I/O commands destined for a system memory are identified. I/O cacheline stores are accumulated in a free area of memory until a full block of data is received with only a directory to the data maintained on a memory controller chip. Then a pointer swap is provided to replace the existing compression block.

20 Claims, 5 Drawing Sheets

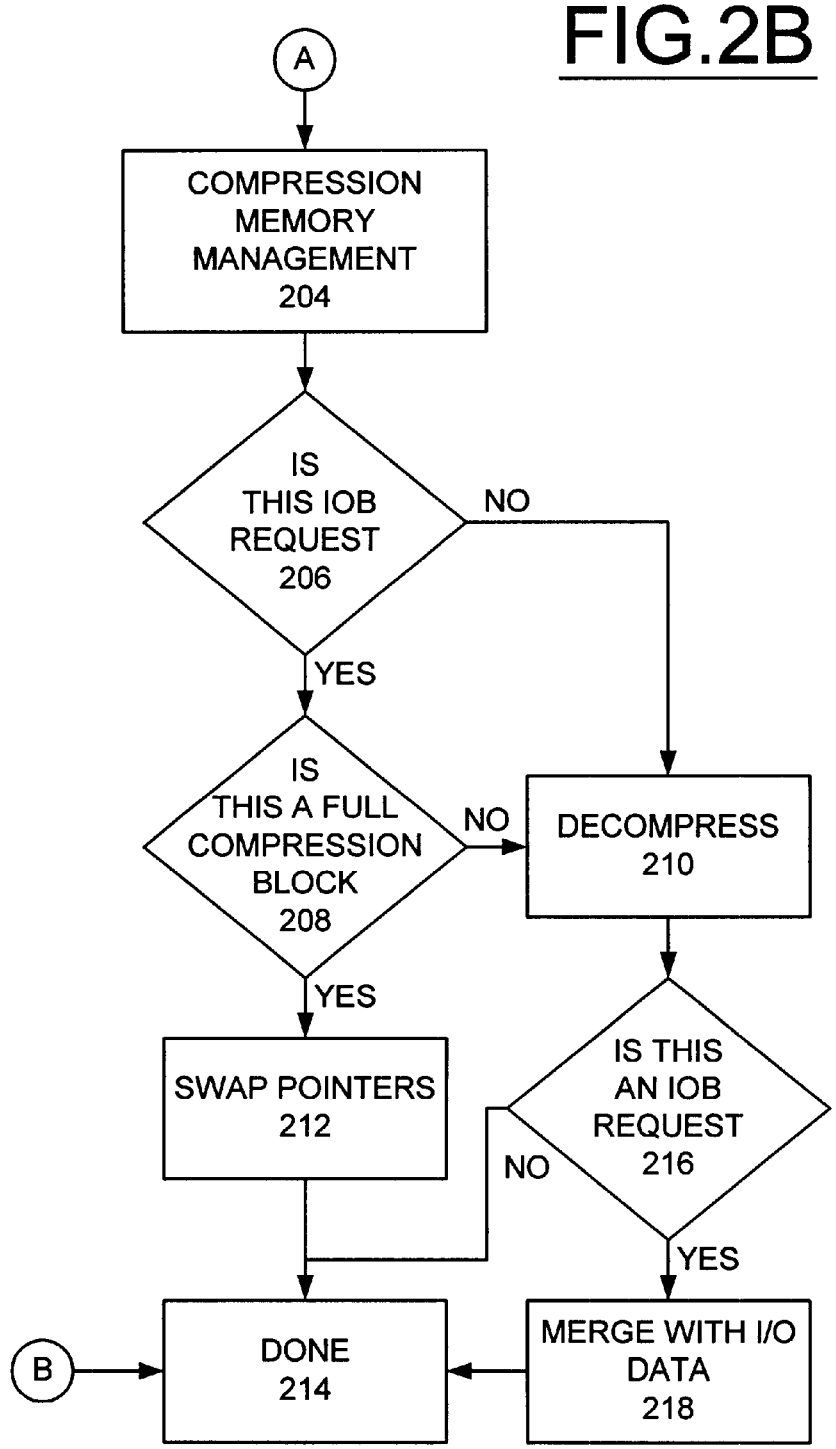

METHOD AND APPARATUS FOR I/O DATA MANAGEMENT WITH AN I/O BUFFER IN COMPRESSED MEMORY SUBSYSTEM

FIELD OF THE INVENTION

The present invention relates generally to the data processing field, and more particularly, relates to a method and apparatus for implementing input/output I/O data management with an I/O buffer in a compressed memory subsystem.

DESCRIPTION OF THE RELATED ART

Computers and computer systems include a main memory that advantageously stores data in a compressed format. In a compressed memory system it is desirable to minimize memory latency and to provide improved efficiency performance.

It is desirable to provide an improved method and apparatus for implementing I/O data management in a compressed memory subsystem.

A need exists for a method and apparatus for implementing I/O data management with an I/O buffer in a compressed memory subsystem. It is desirable to provide such a method and apparatus for implementing I/O data management with an I/O buffer in a compressed memory subsystem that minimizes memory latency and provides improved efficiency performance.

SUMMARY OF THE INVENTION

A principal object of the present invention is to provide a method and apparatus for implementing I/O data management with an I/O buffer in a compressed memory subsystem. Other important objects of the present invention are to provide such method and apparatus for implementing I/O data management with an I/O buffer substantially without negative effect and that overcome many of the disadvantages of prior art arrangements.

In brief, a method and apparatus are provided for implementing input/output IO data management with an I/O buffer (IOB) directory in a compressed memory subsystem. Processor and I/O commands destined for a system memory are identified. An identified command is checked for an IOB flush condition. Responsive to no identified IOB flush condition, the identified command is checked for an IOB hit. Responsive to an identified IOB hit, a next expected I/O store to a cacheline for the IOB hit is incremented.

In accordance with features of the invention, I/O cacheline stores are accumulated in a free area of memory until a full block of data is received with only a directory to the data maintained on a memory controller chip. Then a pointer swap is provided to replace the existing compression block.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A, 2B, and 2C are flow charts illustrating exemplary sequential steps for implementing I/O data management with an I/O buffer in accordance with the preferred embodiment.

DETAILED DESCRIPTION OF THE PREFERRED EMBODIMENTS

Figure 1:
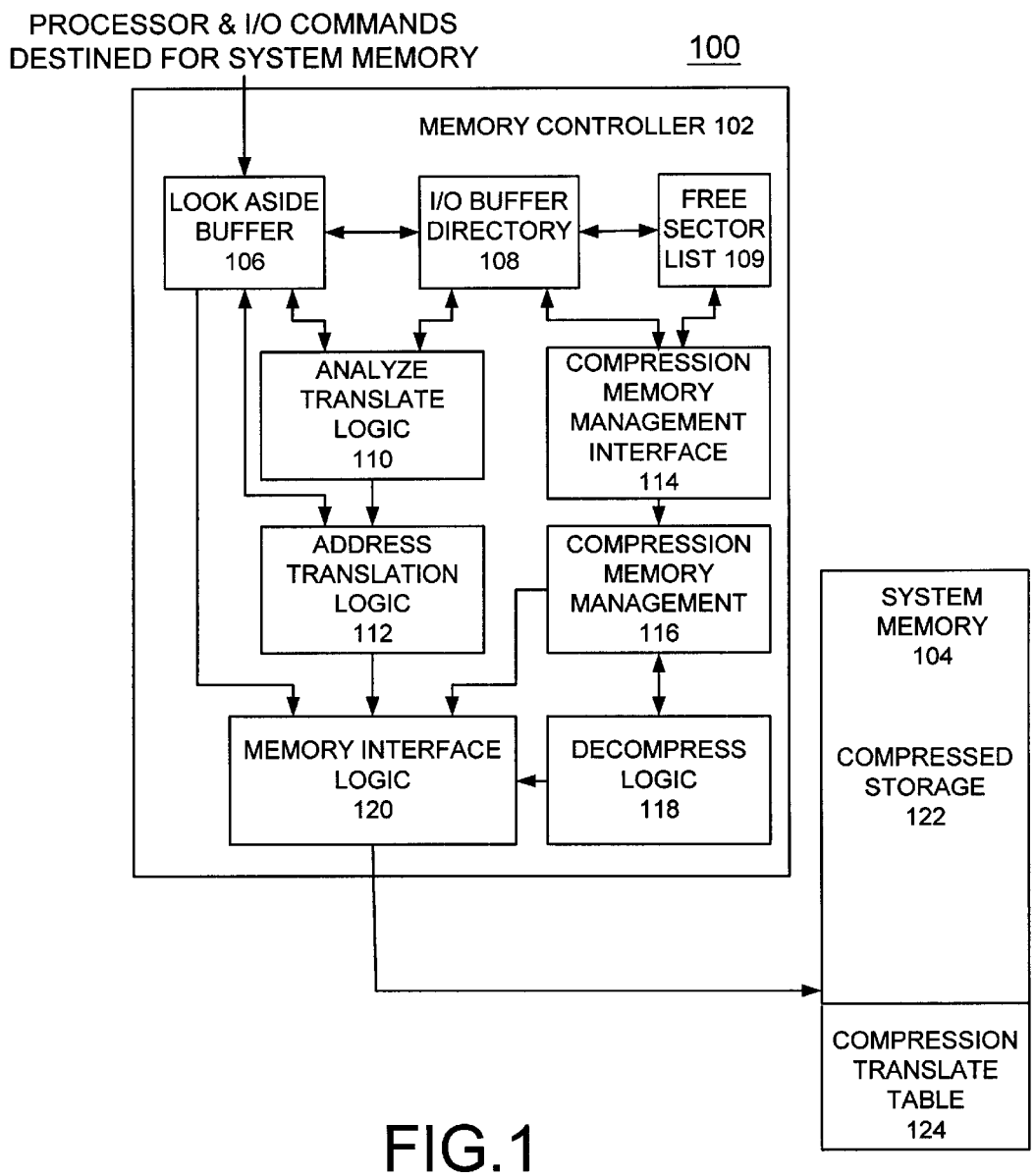
FIG. 1 is a block diagram representation illustrating a memory system for implementing I/O data management with an I/O buffer in accordance with the preferred embodiment.

Having reference now to the drawings, in FIG. 1, there is shown a memory system of the preferred embodiment generally designated by the reference character 100. As shown in FIG. 1, memory system 100 includes a memory controller generally designated by 102, and a system memory 104. Memory controller 102 includes an internal look aside buffer 106 receiving processor and I/O commands destined to the system memory 104. Look aside buffer 106 is coupled to an I/O buffer (IOB) directory 108, an analyze translate table entry logic 110, and an address translation logic 112. A free sector list 109 is coupled to the IOB directory 108 and a compression memory management interface 114. The compression memory management interface 114 is coupled to the IOB directory 108, and the analyze translate table entry logic 110. Compression memory management interface 114 is coupled to a compression memory management 116 that is coupled to a decompress logic 118. A memory interface logic 120 is coupled to the look aside buffer 106, address translation logic 112, compression memory management 116 and decompress logic 118. Memory interface logic 120 is coupled to the system memory 104.

System memory 104 includes a compressed storage 122 and a compression translate table (CTT) 124. The compression translate table 124 residing in system memory 104 is used to map a real address into compressed physical memory sectors.

In memory system 100, where the memory 104 is comprised of a compressed data structure 122 and the block size of the compression management 116 is larger than the cacheline size of the memory operation, an I/O store to system memory 104 consists of 1) a memory fetch of the compression translate table entry; 2) multiple memory fetches for the compressed block of data; 3) a decompress of the compressed block of data; or 4) writeback of decompressed block of data merged with the data from the I/O store.

In accordance with features of the preferred embodiment, the IOB directory 108 is provided within the memory controller 102 to buffer I/O store commands to memory that hit into compressed data regions 122 of memory 104. The IOB directory 108 accumulates all the cacheline stores within the same compression block in free areas of memory before a single fetch of the compressed data or a decompress need be performed. The free areas of memory are determined by the free sector list 109 and requested for use by the IOB directory 108. This is advantageous because the decompression engines in the preferred embodiment work on a 1 KB granularity and the cacheline size in the memory controller 102 is either 64 or 128 bytes. Thus, if a 1 KB block of store commands is accumulated, this enables eliminating performing the memory fetches of the compressed data and the decompress of the 1 KB block. The stores of the accumulated 1 KB block replaces the compressed data block.

In accordance with features of the preferred embodiment, the accumulation of the block of data is done in a free area of memory 104 with only a directory to the data maintained on the memory controller chip 102. When a full block is received, only a pointer swap between the CTT entry and the IOB directory entry is required to replace the existing compressed block.

In accordance with features of the preferred embodiment, even when the entire compression block of I/O store date was not accumulated before a flush of that IOB entry had to be performed, this still reduces memory bandwidth due to eliminating unnecessary writes of the decompressed data block which would be overwritten with the accumulated I/O stores. The flush of an IOB entry normally caused by receiving the last cacheline of the compression block or any of the following conditions when the complete compression block will not be received 1) the incoming op to the next expected cacheline is from a processor and not I/O; 2) the incoming op was not a cacheline store to the next expected cacheline; 3) the incoming op was not the next expected cacheline, that is the op came out of sequence; and 4) the entry aged and was invalidated so it could be reused by a more recent access. I/O store traffic, for example, writes that have originated from devices that reside on PCI/PCI-X busses, to system memory 104 tend to have certain characteristics that are used to advantage. More specifically, device drivers typically are written such that when data movement is to be performed from an I/O device to system memory it is done in contiguous cachelines that comprise either 1 KB blocks or 4 KB pages. IOB directory 108 is implemented based on this arrangement.

In accordance with features of the preferred embodiment, the I/O buffer implementation provides a number of advantages including reduced memory utilization due to eliminating compressed block fetches. Also the number of decompression operations required to process I/O stores is reduced. The decompression engines are freed up for more memory latency critical ops, for example, processor fetches to memory. Data buffering resides in physical memory 104 and not in chip memory so that vast amounts of silicon are not required.

Figure 2A:
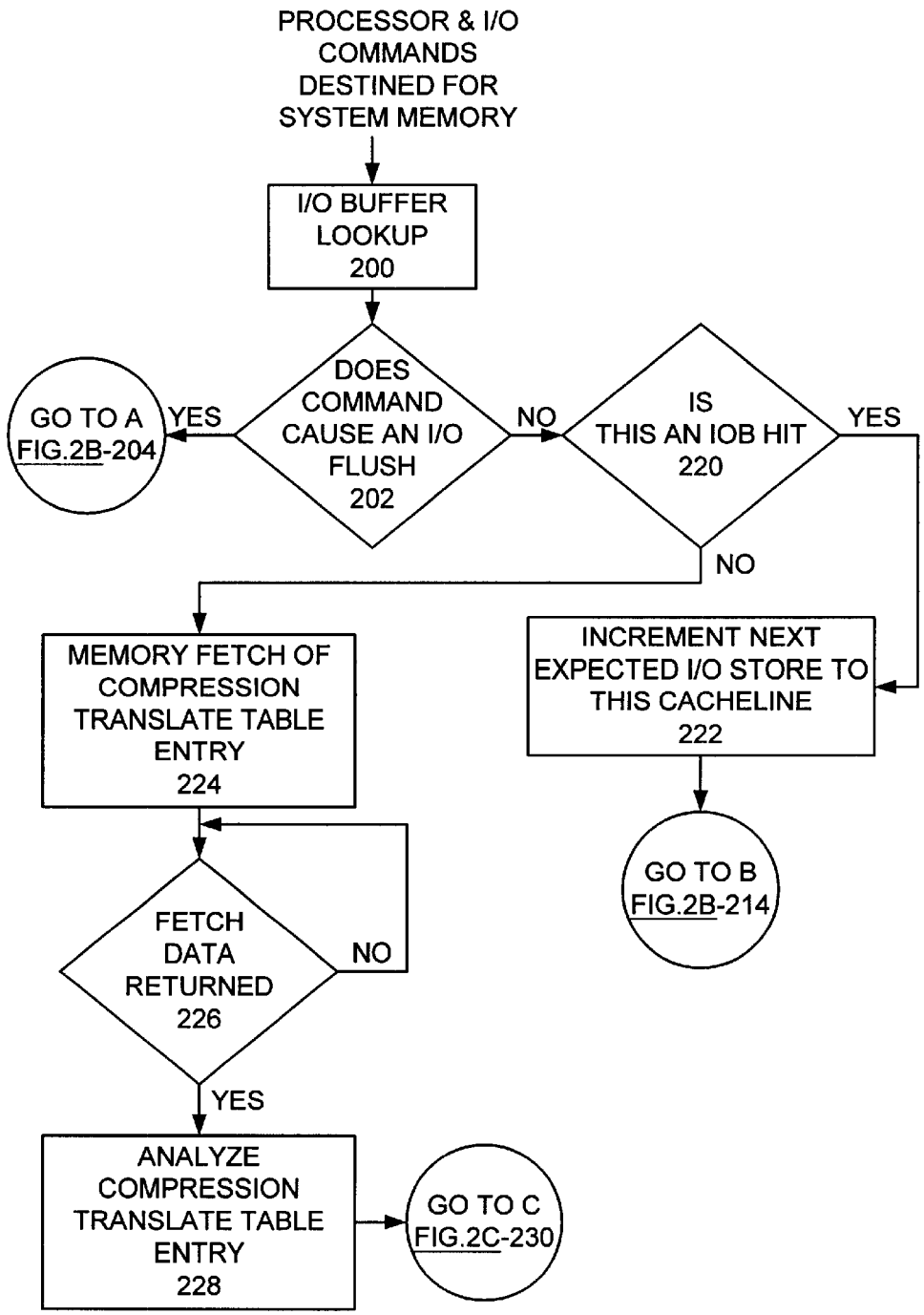
Figure 2C:
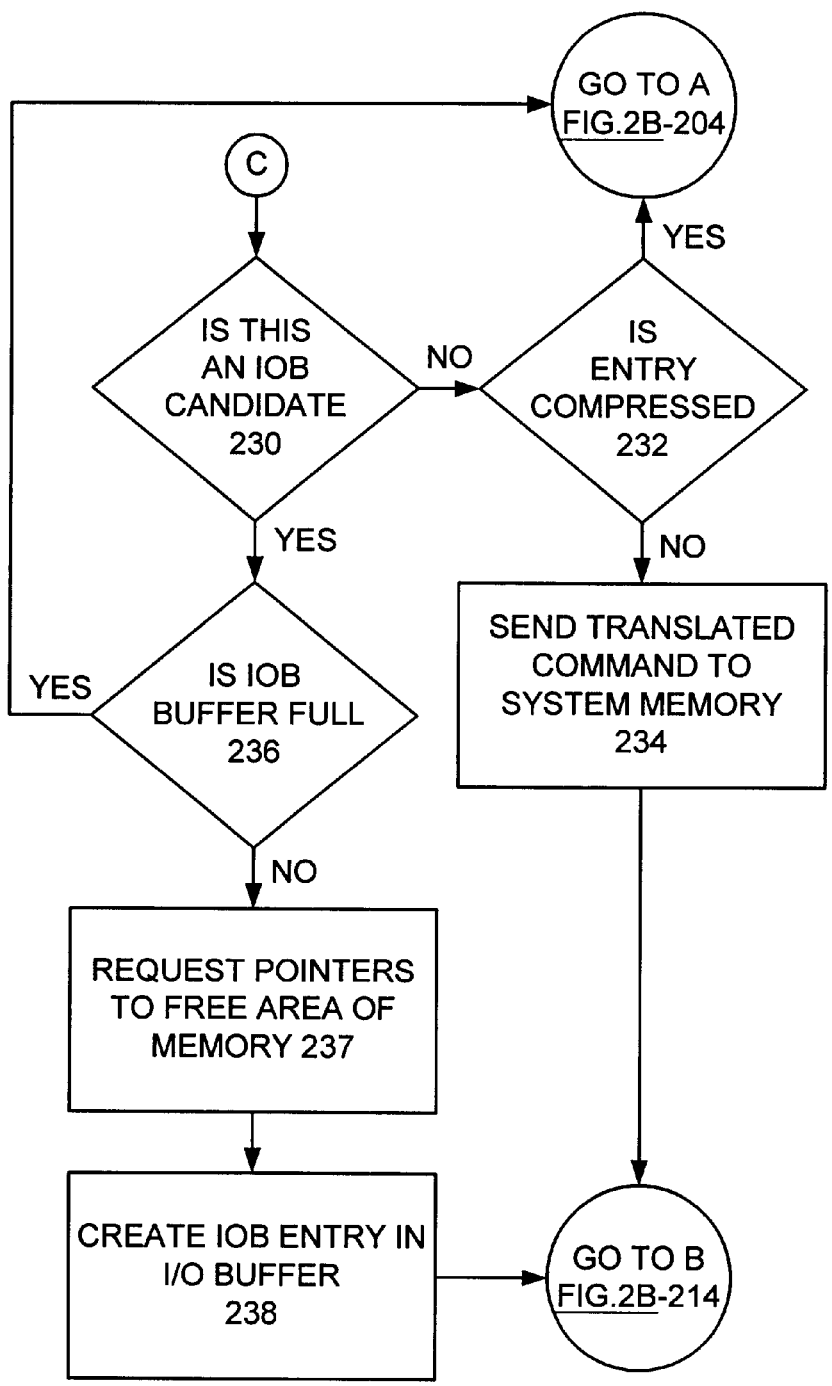

Referring to FIGS. 2A, 2B, and 2C, there are shown exemplary sequential steps for implementing I/O data management with an I/O buffer directory in accordance with the preferred embodiment. Responsive to receiving processor and I/O commands destined for system memory 104, an I/O buffer lookup is performed as indicated in a block 200 in FIG. 2A. Checking whether the command causes an I/O flush is performed as indicated in a decision block 202. When the command causes an I/O flush, the sequential operations continue following entry point A in FIG. 2B.

Referring to FIG. 2B following entry point A, compression memory management is performed as indicated in a block 204. Checking whether this is an IOB request is performed as indicated in a decision block 206. When this is an IOB request, then checking whether this is a full compression block is performed as indicated in a decision block 208. When the IOB request is not a full compression block and when this is not an IOB request, then a decompress of the compressed block of data is performed as indicated in a block 210. When the IOB request is a full compression block, then a pointer swap is provided to replace the existing compressed block as indicated in a block 212. This completes the sequential operations as indicated in a block 214. After the decompress at block 210, checking whether this is an IOB request is performed as indicated in a decision block 216. If this is not an IOB request, then this completes the sequential operations at block 214. When this is an IOB request, then the decompress data is merged with I/O data as indicated in a block 218. This completes the sequential operations at block 214.

Referring again to FIG. 2A, when determined at decision block 202 that the command does not cause an I/O flush, checking whether this is an IOB hit to an existing entry in the IOB directory 108 is performed as indicated in a decision block 220. When this is an IOB hit, a next expected I/O store to this cacheline is incremented as indicated in a block 222. This completes the sequential operations as indicated following entry point B at block 214 in FIG. 2B. Otherwise, when determined at decision block 220 that this is not an IOB hit, then a memory fetch of the compression translate table entry is performed as indicated in a block 224. Checking for the fetch data returned is performed as indicated in a decision block 226. When the fetch data is returned, then the compression translate table entry is analyzed as indicated in a block 228. The sequential operations continue following entry point C in FIG. 2C.

Referring to FIG. 2C following entry point C, checking whether this is an IOB candidate is performed as indicated in a decision block 230. When this is not an IOB candidate, checking whether the entry is compressed is performed as indicated in a decision block 232. If the entry is compressed, then the sequential operations return to entry point A in FIG. 2B at block 204. If the entry is not compressed, then the translated command is sent to system memory 104 as indicated in a block 234. This completes the sequential operations as indicated following entry point B at block 214 in FIG. 2B. When this is an IOB candidate, checking whether the IOB directory is full is performed as indicated in a decision block 236. If the IOB directory is full, then the sequential operations return to entry point A in FIG. 2B at block 204. If the IOB directory is not full, then a request is made to the free sector list to obtain a new buffer in free memory as indicated in a block 237. Next an IOB entry is created in the IOB directory pointing to the new buffer as indicated in a block 238. This completes the sequential operations as indicated following entry point B at block 214 in FIG. 2B.

Figure 3:
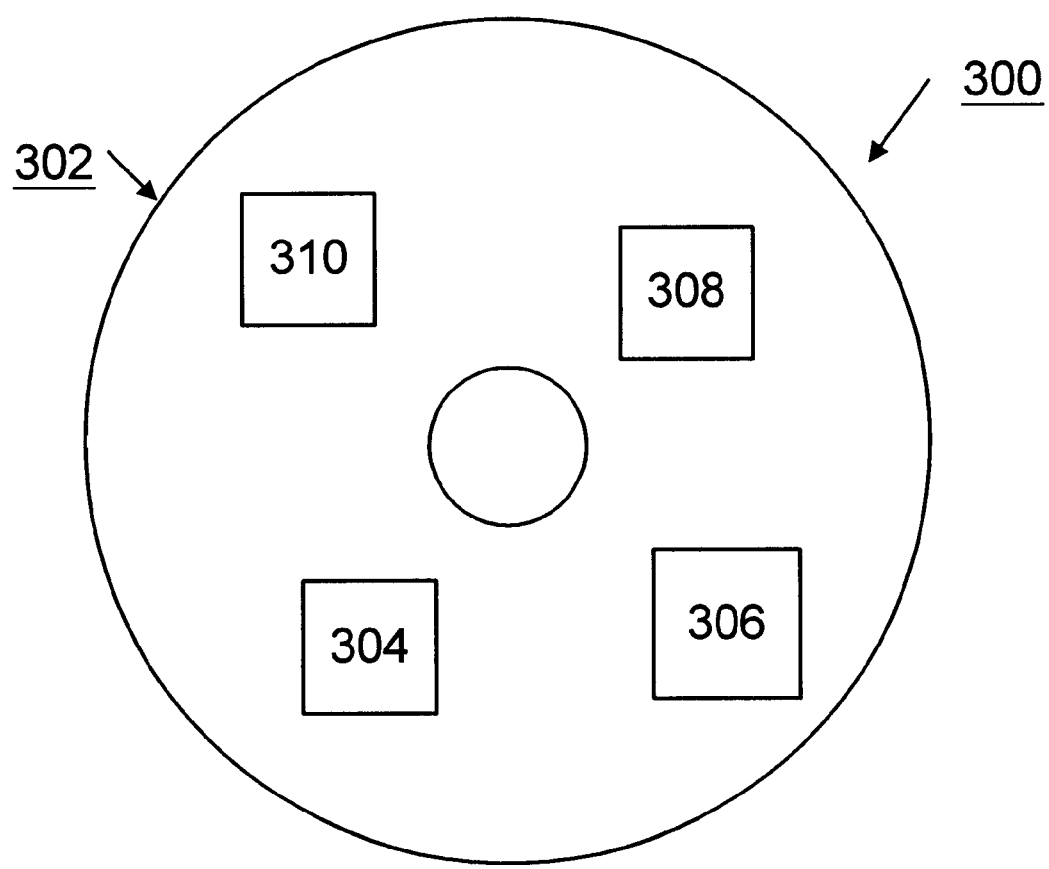
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for implementing I/O data management with an I/O buffer of the preferred embodiment in the system 100 of FIG. 1.

A sequence of program instructions or a logical assembly of one or more interrelated modules defined by the recorded program means 304, 306, 308, 310, direct the memory system 100 for implementing I/O data management with an I/O buffer of the preferred embodiment.

While the present invention has been described with reference to the details of the embodiments of the invention shown in the drawing, these details are not intended to limit the scope of the invention as claimed in the appended claims.

What is claimed is:

1. A method for implementing I/O data management with an I/O buffer (IOB) directory in a compressed memory subsystem comprising the steps of:

identifying processor and I/O commands destined for a system memory;

checking an identified command for an IOB flush condition;

responsive to no identified IOB flush condition, checking said identified command for an IOB hit; and responsive to an identified IOB hit, incrementing a next expected I/O store to a cacheline for said IOB hit.

2. A method for implementing I/O data management with an I/O buffer (IOB) directory in a compressed memory subsystem as recited in claim 1 includes the step of responsive to no identified IOB hit, performing a memory fetch of a compression translate table entry.

3. A method for implementing I/O data management with an I/O buffer (IOB) directory in a compressed memory subsystem as recited in claim 2 includes the step of analyzing said compression translate table entry and checking whether said identified command is a possible IOB candidate.

4. A method for implementing I/O data management with an I/O buffer (IOB) directory in a compressed memory subsystem as recited in claim 3 includes the step of responsive to identifying that said identified command is said possible IOB candidate, creating an entry in the IOB directory.

5. A method for implementing I/O data management with an I/O buffer (IOB) directory in a compressed memory subsystem as recited in claim 3 includes the step of responsive to identifying that said identified command is not a possible IOB candidate, checking whet her said identified command is compressed.

6. A method for implementing I/O data management with an I/O buffer (IOB) directory in a compressed memory subsystem as recited in claim 5 includes the step of responsive to said identified command being compressed, performing compression memory management.

7. A method for implementing I/O data management with an I/O buffer (IOB) directory in a compressed memory subsystem as recited in claim 5 includes the step of responsive to said identified command not being compressed, sending a translated command to system memory.

8. A method for implementing I/O data management with an I/O buffer (IOB) directory in a compressed memory subsystem as recited in claim 1 includes the step of responsive to an identified flush condition, performing compression memory management.

9. A method for implementing I/O data management with an I/O buffer (IOB) directory in a compressed memory subsystem as recited in claim 8 includes the step of checking whether said identified command is a IOB request.

10. A method for implementing I/O data management with an I/O buffer (IOB) directory in a compressed memory subsystem as recited in claim 9 includes the step of responsive to said identified command being said IOB request, checking whether said identified command is a full predefined data block.

11. A method for implementing I/O data management with an I/O buffer (IOB) directory in a compressed memory subsystem as recited in claim 10 wherein the step of checking whether said identified command is said full predefined data block includes the step of checking whether said identified command is a compression data block.

12. A method for implementing I/O data management with an I/O buffer (IOB) directory in a compressed memory subsystem as recited in claim 10 includes the step of responsive to said identified command being said full predefined data block, performing a pointer swap for replacing an existing compressed data block.

13. A method for implementing I/O data management with an I/O buffer (IOB) directory in a compressed memory subsystem as recited in claim 10 includes the step of responsive to said identified command not being said full predefined data block, performing a decompress of said identified command and merging said decompressed command with I/O data for said IOB request.

14. A method for implementing I/O data management with an I/O buffer (IOB) directory in a compressed memory subsystem as recited in claim 9 includes the step of responsive to said identified command not being said IOB request, performing a decompress of said identified command.

15. Apparatus for implementing I/O data management in a compressed memory subsystem comprising:

a system memory;

a memory controller coupled to said system memory; said memory controller including;

a memory interface logic coupled to said system memory;

address translation logic coupled to said memory interface logic for performing memory address translation;

a look aside buffer for receiving processor and I/O commands destined for said system memory, said look aside buffer coupled to said memory interface logic and said address translation logic;

an I/O buffer (IOB) directory coupled to said look aside buffer;

compression memory management interface logic coupled to said IOB directory for performing compression memory management;

analyze translate table entry logic coupled to said IOB directory and said look aside buffer; and said IOB directory for checking an identified command for a flush condition; responsive to no identified flush condition, checking said identified command for an IOB hit; and responsive to an identified IOB hit, incrementing a next expected I/O store to a cacheline for said IOB hit.

16. Apparatus for implementing I/O data management in a compressed memory subsystem as recited in claim 15 wherein said IOB directory responsive to no identified IOB hit, for performing a memory fetch of a compression translate table entry.

17. Apparatus for implementing I/O data management in a compressed memory subsystem as recited in claim 16 wherein said IOB directory for analyzing said compression translate table entry and checking whether said identified command is a possible IOB candidate.

18. Apparatus for implementing I/O data management in a compressed memory subsystem as recited in claim 15 wherein said IOB directory responsive to identifying that said identified command is said possible IOB candidate, for creating an entry in the IOB directory.

19. Apparatus for implementing I/O data management in a compressed memory subsystem as recited in claim 15 wherein said IOB directory for accumulating a predetermined data block size of I/O command stores in the system memory.

20. Apparatus for implementing I/O data management in a compressed memory subsystem as recited in claim 19 wherein said IOB directory for providing a pointer swap for said accumulated predetermined data block size of I/O command stores for replacing an existing compressed data block.

* * * * *